(12) United States Patent
Tabata

(10) Patent No.: US 12,088,998 B2
(45) Date of Patent: Sep. 10, 2024

(54) VEHICLE-MOUNTED WOOFER DEVICE

(71) Applicant: Foster Electric Company, Limited, Tokyo (JP)

(72) Inventor: Takayuki Tabata, Tokyo (JP)

(73) Assignee: FOSTER ELECTRIC COMPANY, LIMITED, Tokyo (JP)

( * ) Notice: Subject to any disclaimer, the term of this patent is extended or adjusted under 35 U.S.C. 154(b) by 366 days.

(21) Appl. No.: 17/615,268

(22) PCT Filed: Apr. 27, 2020

(86) PCT No.: PCT/JP2020/018032
§ 371 (c)(1),
(2) Date: Nov. 30, 2021

(87) PCT Pub. No.: WO2020/241154
PCT Pub. Date: Dec. 3, 2020

(65) Prior Publication Data
US 2022/0225017 A1 Jul. 14, 2022

(30) Foreign Application Priority Data
May 31, 2019 (JP) .................. 2019-102557

(51) Int. Cl.
*H04R 1/28* (2006.01)
*H04R 1/02* (2006.01)
(Continued)

(52) U.S. Cl.
CPC ........... *H04R 1/2888* (2013.01); *H04R 1/021* (2013.01); *H04R 1/26* (2013.01); *H04R 1/2857* (2013.01);
(Continued)

(58) Field of Classification Search
CPC .... H04R 1/021; H04R 1/2857; H04R 1/2869; H04R 1/2888; H04R 2499/13
(Continued)

(56) References Cited

U.S. PATENT DOCUMENTS 8,708,092 B2 * 4/2014 Ito .................. H04R 1/2842
381/349
2012/0219171 A1 8/2012 Velican
2014/0131134 A1 5/2014 Kobayashi

FOREIGN PATENT DOCUMENTS

CN 106973338 A * 7/2017 ............... H04R 1/20
CN 206908840 U * 1/2018
(Continued)

OTHER PUBLICATIONS

English translation of DE-102015013879-A1, accessed Jan. 24, 2024 via Espacenet (Year: 2016).*
(Continued)

*Primary Examiner* — Jeremy A Luks
(74) *Attorney, Agent, or Firm* — ALLEN, DYER ET AL.

(57) ABSTRACT

An on-vehicle woofer system includes: a speaker unit including a magnetic circuit and a diaphragm connected to the magnetic circuit, and capable of generating sound waves by electrically driving the magnetic circuit to vibrate the diaphragm; a Helmholtz resonator to which a first surface of the diaphragm is oriented, the Helmholtz resonator being connected to the speaker unit; a sealed container to which a second surface of the diaphragm that is a back surface of the first surface is oriented, the sealed container providing a sealed space connected to the speaker unit; and a tube penetrating the Helmholtz resonator, the speaker unit, and the sealed container.

8 Claims, 9 Drawing Sheets

(51) Int. Cl.
  *H04R 1/26*  (2006.01)
  *H04R 9/02*  (2006.01)
(52) U.S. Cl.
  CPC ......... *H04R 9/025* (2013.01); *H04R 2499/13* (2013.01)
(58) Field of Classification Search
  USPC ........................................ 181/155, 156, 199
  See application file for complete search history.

(56)  References Cited

FOREIGN PATENT DOCUMENTS

| | | | | |
|---|---|---|---|---|
| CN | 207820222 U | * | 9/2018 | |
| DE | 102015013879 A1 | * | 4/2016 | |
| DE | 102019002654 A1 | * | 10/2020 | ............. G10K 11/04 |
| EP | 0653331 | | 5/1995 | |
| EP | 2495990 | | 9/2012 | |
| JP | 1995137581 | | 5/1995 | |
| JP | 2012053940 | | 2/2012 | |
| JP | 2013509049 | | 3/2013 | |
| WO | WO2010036528 | | 4/2010 | |
| WO | WO2011052080 | | 5/2011 | |
| WO | WO2013005578 | | 1/2013 | |

OTHER PUBLICATIONS

English translation of CN-206908840-U, accessed Jan. 24, 2024 via Espacenet (Year: 2018).*
International Search Report and Written Opinion for PCT/JP2020/018032; Japanese Patent Office; Jul. 21, 2020; entire document.

* cited by examiner

VEHICLE-MOUNTED WOOFER DEVICE

CROSS-REFERENCE TO RELATED APPLICATIONS

This application is the § 371 National Stage Entry of International Application No. PCT/JP2020/018032, filed on Apr. 27, 2020, which claims the benefit of Japanese Patent Application No. 2019-102557, filed on May 31, 2019, the contents of which applications are herein incorporated by reference in their entirety.

FIELD OF THE INVENTION

The present disclosure relates to a woofer system to be mainly mounted on a vehicle.

BACKGROUND OF THE INVENTION

In recent years, in the environment of music reproduction in the vehicle cabin of an automobile, the spread of digital contents that make an occupant easily enjoy high-quality sound increasingly gives opportunities to reproduce even deep bass.

The location of an on-vehicle woofer system in an automobile is limited mainly to the inside of a door, a partition between a vehicle cabin and a luggage compartment (trunk), such as the back surface of a rear seat, or under a seat, for example. This is because there is a need to emit sound waves toward the inside of the vehicle cabin and to secure the space for placing the woofer system.

In particular, employing a speaker unit including a woofer for reproducing bass and a subwoofer for reproducing deep bass, an on-vehicle woofer system is generally in a large size. An idea is needed to mount such a large system in a limited space for placement.

For example, there is Patent Document 1 as a technique for reducing the size of an on-vehicle speaker system such as a woofer for reproducing bass. There is, for example, Patent Document 2 that provides an idea of the location of an on-vehicle woofer system.

Patent Document 1 describes a configuration of a speaker system including at least one Helmholtz resonator including a vent duct.

Patent Document 2 describes the following configuration of an on-vehicle speaker. A speaker box is housed in a wheel recess. A bolt is drawn out of the bottom of the housing recess and a nut is screwed onto the end of the bolt from the top of the speaker box to fix the speaker box into the wheel recess.

However, Patent Document 1 fails to disclose any structure for fixing the speaker system, for example, any structure for securing the airtightness of the part other than the duct of the Helmholtz resonator at the time of placing the speaker system in a spare tire housing as in Patent Document 2.

On the other hand, Patent Document 2 fails to disclose any structure like a Helmholtz resonator, or any airtight structure such as a though-hole through which the bolt is inserted in the configuration of segmenting the inside of the speaker.

CITATION LIST

Patent Documents

Patent Document 1: Japanese Unexamined Patent Application Publication (Published Japanese Translation of PCT Application) No. 2013-509049.

Patent Document 2: Japanese Unexamined Patent Publication No. H7-137581

SUMMARY OF THE INVENTION

The present disclosure was made to solve such problems. It is an objective of the present disclosure to provide an on-vehicle woofer system that achieves miniaturization and bass reproduction and that can be efficiently placed in a spare tire housing, for example.

In order to achieve the objective, an on-vehicle woofer system according to the present disclosure includes: a speaker unit including a magnetic circuit and a diaphragm connected to the magnetic circuit, and capable of generating sound waves by electrically driving the magnetic circuit to vibrate the diaphragm; a Helmholtz resonator to which a first surface of the diaphragm is oriented, the Helmholtz resonator being connected to the speaker unit; a sealed container to which a second surface of the diaphragm that is a back surface of the first surface is oriented, the sealed container providing a sealed space connected to the speaker unit; and a tube penetrating the Helmholtz resonator, the speaker unit, and the sealed container.

The speaker unit includes a seal for connecting the Helmholtz resonator and the sealed container to form the tube, and separating an internal space of the Helmholtz resonator or an internal space of the sealed container from the internal space of the tube.

The on-vehicle woofer system further includes: an upper cover member connected to the speaker unit; and a duct in the upper cover member. The Helmholtz resonator includes: a chamber space defined by at least the speaker unit and the upper cover member; and an outer circumferential duct space connected to the chamber space and segmented along an outer circumference of the speaker unit, and the Helmholtz resonator is configured such that the outer circumferential duct space communicates with an outside via the duct.

The on-vehicle woofer system further includes; a base member connected to the speaker unit. The sealed container is defined by at least the speaker unit and the base member.

The magnetic circuit is connected to the second surface of the diaphragm.

The magnetic circuit is connected to the second surface of the diaphragm.

The Helmholtz resonator has a resonance frequency set higher than an upper limit of an operation band frequency of the speaker unit.

The on-vehicle woofer system has a substantially cylindrical outer shape.

The on-vehicle woofer system is placed in a spare tire housing of an automobile, and fixed to the spare tire housing using a fixing tool to be inserted through the tube.

The on-vehicle woofer system according to the present disclosure using the means described above achieves miniaturization and bass reproduction and that can be efficiently installed in a spare tire housing, for example.

DETAILED DESCRIPTION OF PREFERRED EMBODIMENT

Now, an embodiment of the present disclosure will be described with reference to the drawings.
(Overall Structure of On-Vehicle Woofer System)

Figure 1:
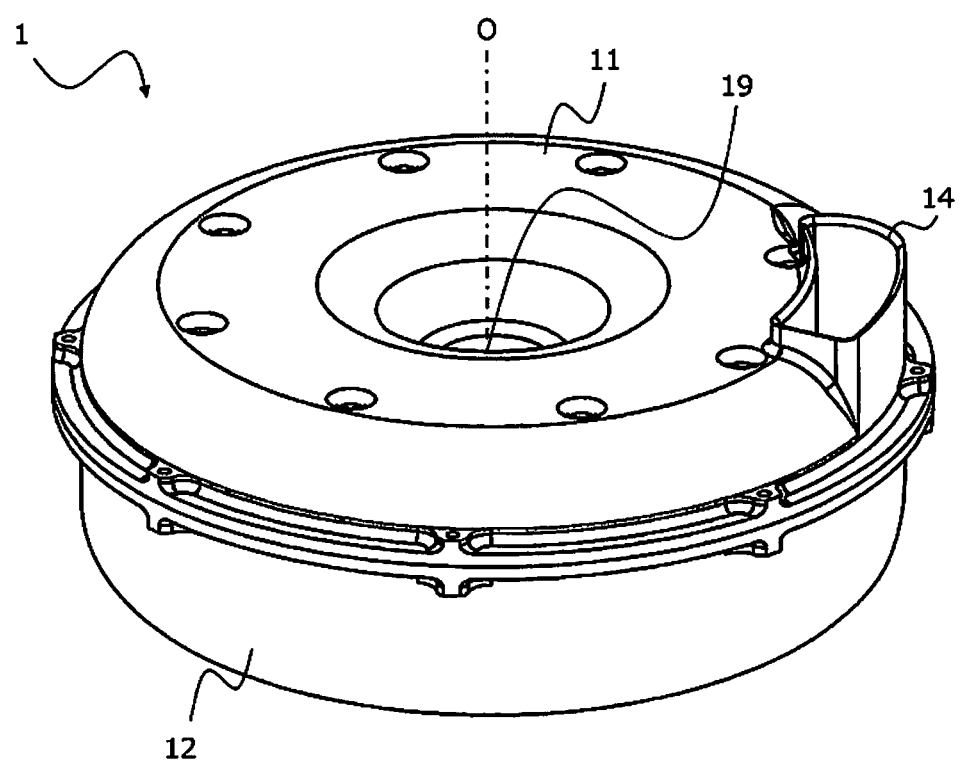
FIG. 1 is a perspective view of an on-vehicle woofer system according to an embodiment of the present disclosure.
Figure 2:
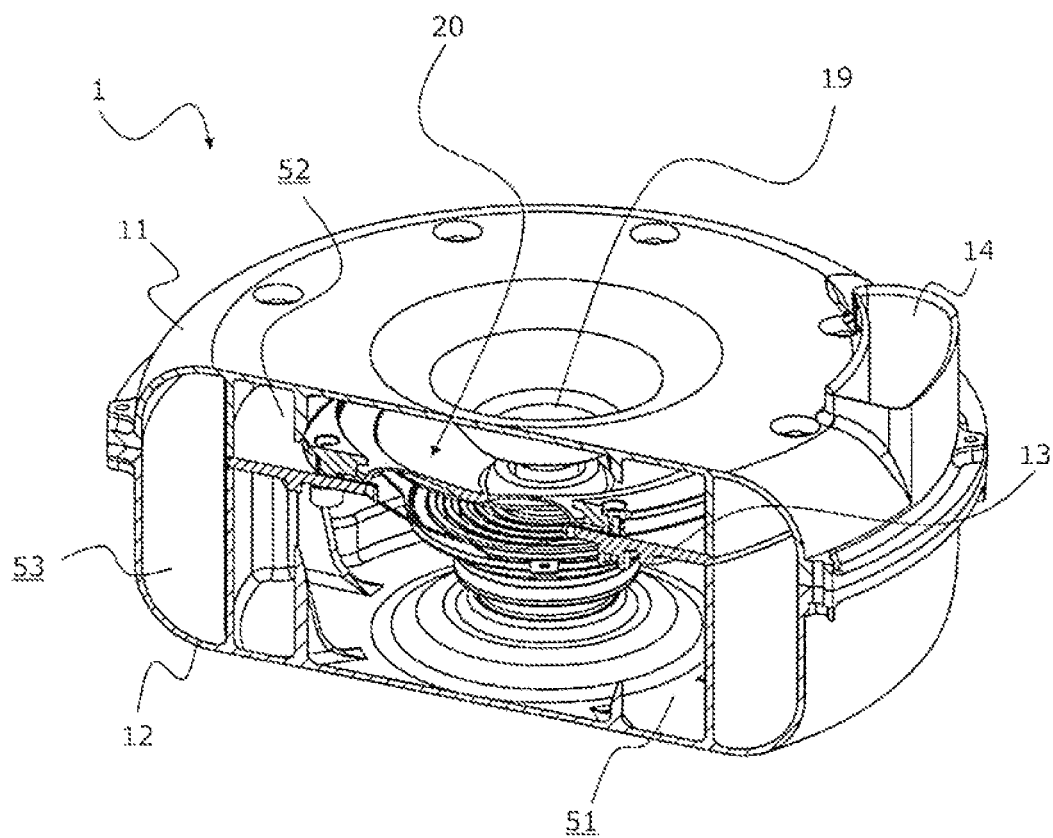
FIG. 2 is a perspective cross-sectional view of an on-vehicle woofer system according to an embodiment of the present disclosure.
Figure 3:
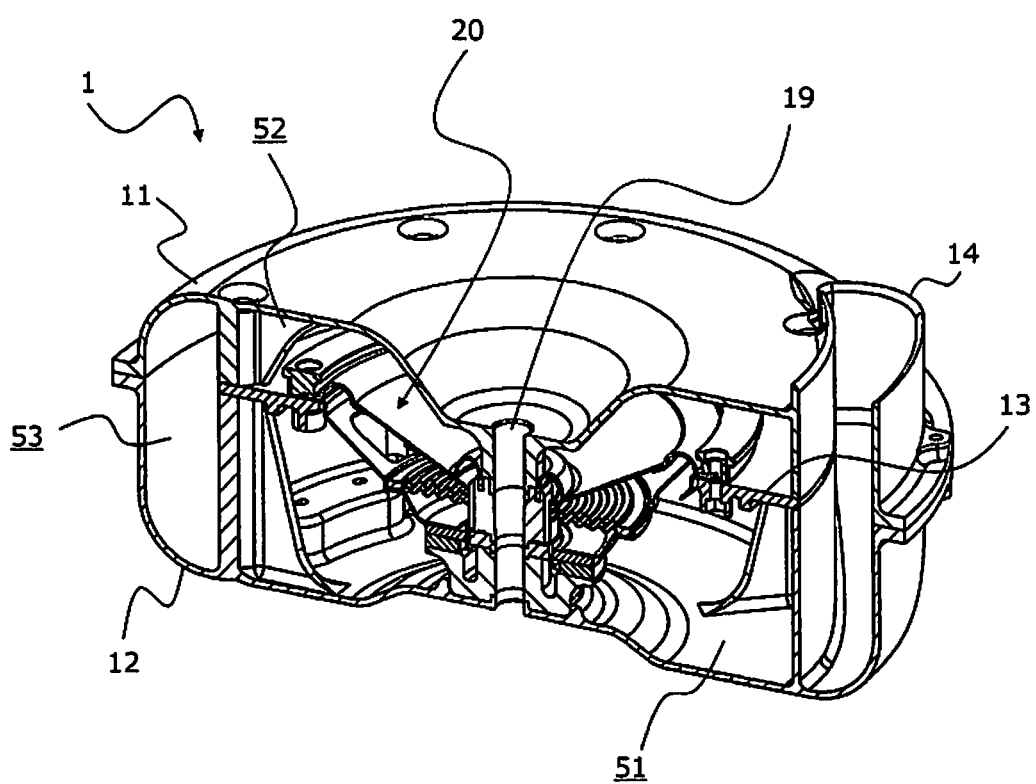
FIG. 3 is a perspective cross-sectional view of the on-vehicle woofer system according to the embodiment of the present disclosure.
Figure 4:
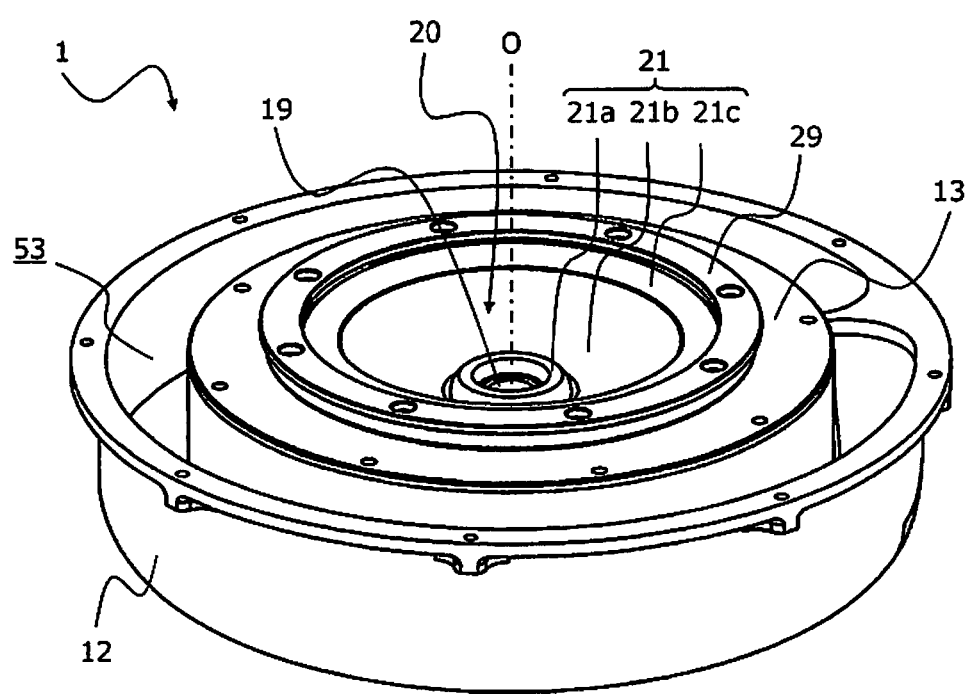
FIG. 4 is a perspective view of the on-vehicle woofer system according to the embodiment of the present disclosure with an upper cover removed.
Figure 5:
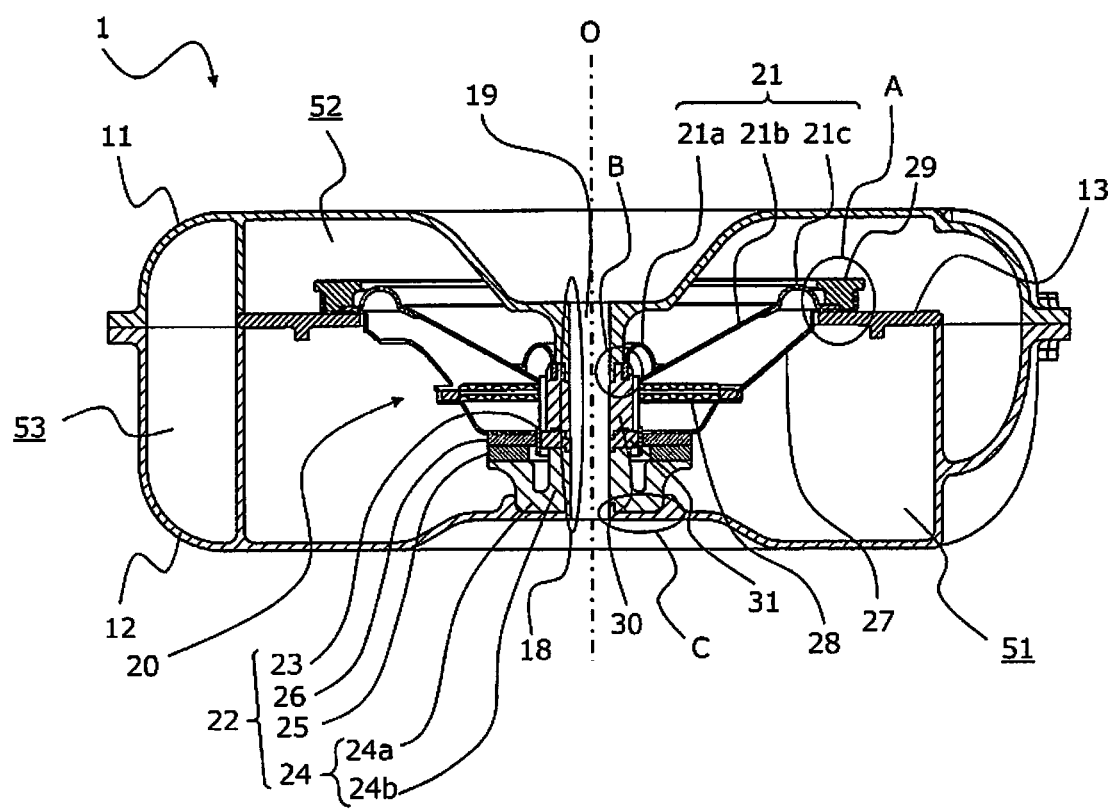
FIG. 5 is a cross-sectional view of the on-vehicle woofer system according to the embodiment of the present disclosure.

An on-vehicle woofer system 1 according to the embodiment of the present disclosure will be described with reference to FIGS. 1 to 5. FIG. 1 is a perspective view of the on-vehicle woofer system 1 according to the embodiment of the present disclosure. FIGS. 2 and 3 are perspective cross-sectional views of the on-vehicle woofer system according to the embodiment of the present disclosure. FIG. 4 is a perspective view of the on-vehicle woofer system according to the embodiment of the present disclosure with an upper cover removed. FIG. 5 is a cross-sectional view taken along the center axis O of the on-vehicle woofer system according to the embodiment of the present disclosure.

The on-vehicle woofer system 1 is a speaker system in a substantially cylindrical shape formed by joining an upper cover member 11 and a base member 12. The on-vehicle woofer system 1 has a through-hole 19 coaxial with the center axis O of the substantially cylindrical shape. The on-vehicle woofer system 1 includes a duct 14 at an end. The on-vehicle woofer system 1 includes a speaker unit 20 inside. As shown in FIG. 4, the speaker unit 20 has a frame 29 that is fixed to an intermediate plate member 13 inside the on-vehicle woofer system 1. The intermediate plate member 13 is fixed to the base member 12. The intermediate plate member 13 and the base member 12 may be formed integrally. The intermediate plate member 13 may be fixed to the upper cover member 11 or may be formed integrally with the upper cover member 11.

The internal space of the on-vehicle woofer system 1 is divided into a sealed space 51 and a combined space with the speaker unit 20 as a boundary. The combined space is the combination of a chamber space 52 and an outer circumferential duct space 53 that constitute a Helmholtz resonator. Here, a diaphragm 21 constituting the speaker unit 20 has a first surface intersecting the vibration direction, and a second surface that is the back surface of the first surface. The sealed space 51 serves as a sealed container enclosed by the base member 12, the intermediate plate member 13, and the speaker unit 20. Oriented to the sealed space 51 is the second surface of the diaphragm 21. The chamber space 52 is defined by the upper cover member 11, the intermediate plate member 13, and the speaker until 20. Oriented to the chamber space 52 is the first surface of the diaphragm 21. The outer circumferential duct space 53 is defined by the upper cover member 11 and the base member 12, and surrounds the circumference of the speaker until 20. The outer circumferential duct space 53 is connected to a part of the chamber space 52. The duct 14 is located in the upper cover member 11 so that the outer circumferential duct space 53 communicates with the outside via the duct 14. Together with the chamber space 52, the outer circumferential duct space 53, and the opening of the duct 14, the upper cover member 11 forms the Helmholtz resonator. As described above, the first surface of the diaphragm 21 constituting the speaker unit 20 is oriented to the chamber space 52 that forms the Helmholtz resonator, whereas the second surface of the diaphragm 21 is oriented to the sealed space 51. The sound waves are emitted from the speaker unit 20 through the chamber space 52, the outer circumferential duct space 53, and the opening of the duct 14 to the outside. The Helmholtz resonator will be described later.

As shown in FIG. 5, the speaker unit 20 includes the diaphragm 21 and a magnetic circuit 22. The speaker unit 20 is in a substantially concentric circular shape having the center axis passing through the center of the diaphragm 21 and parallel to the vibration direction. The center axis is coaxial with the enter axis O of the substantially cylindrical shape of the whole on-vehicle woofer system 1. The diaphragm 21 includes a center edge 21a around the through-hole 19 at the center, a cone 21b extending radially outward from the center, and a circumferential edge 21c around the circumference of the cone 21b. The center edge 21a is connected airtightly to a tubular first seal 30. Connected air-tight to the lower end of the first seal 30 is a tubular second seal 31 which is connected airtightly to a column 24b of a yoke 24, which will be described later, to constitute a part of a tube 18 serving as a part of the through-hole 19 at the center of the on-vehicle woofer system 1. The center axis of the speaker until 20 and the center axis O of the substantially cylindrical shape of the whole on-vehicle woofer system 1 may shift from each other as long as a through-hole can be formed.

The center proximal end of the cone 21b is connected to a voice coil bobbin 23 wound with a coil of the magnetic circuit 22 to transmit the vibration of the voice coil bobbin 23. That is, the axial direction of the speaker unit 20 coincides with the amplitude direction of the diaphragm 21.

The magnetic circuit 22 includes the yoke 24 having a back surface serving as a disk-shaped flange 24a, and the column 24b projecting from the center of the flange 24a. Disposed on the outer circumference of the column 24b of the yoke 24 vibratably along the axis is the voice coil bobbin 23 which is provided with an annular magnet 25 on its outer circumference. The magnet 25 is sandwiched between the flange 24a of the yoke 24 and an annular plate 26.

The magnetic circuit 22 mainly includes the voice coil bobbin 23, the yoke 24, the magnet 25, and the plate 26, and is what is called an "external magnetic circuit" having the magnet 25 on the outer side of the magnetic circuit.

The region from the plate 26 to the circumferential edge 21c of the diaphragm 21 is covered with a frame 27. Interposed between the inner surface of the frame 27 and the outer circumference of the voice coil bobbin 23 is a damper 28 which vibratably supports the voice coil bobbin 23.

The voice coil bobbin 23 is wound with a voice coil which is connected to a signal transmission circuit. The voice coil bobbin 23 vibrates upon receipt of a signal from the signal transmission circuit. Incorporated into the signal transmission circuit may be a device, such as a low-pass filter or a band-pass filter, which limits the frequency band for driving the voice coil bobbin 23.

Referring back to the overall structure of the on-vehicle woofer system 1, the frame 29 of the speaker unit 20 and the intermediate plate member 13 that constitutes the Helmholtz resonator airtightly divide the chamber space 52 from the sealed space 51 at a close contact A. The first seal 30 and the upper cover member 11 that constitutes the Helmholtz resonator airtightly divide the chamber space 52 from the through hole 19 at a close contact B. The yoke 24 and the base member 12 that constitutes the sealed container airtightly divide the sealed space 51 from the through-hole 19 at a close contact C. In this manner, the tube 18 is formed which constitutes the through-hole 19 penetrating the Helmholtz resonator, the speaker unit 20, and the sealed container. The internal space of the Helmholtz resonator, the internal space of the sealed container, and the through-hole 19, which is the internal space of the tube 18, can be separated from each other.

(Helmholtz Resonator).

Next, the Helmholtz resonator will be described. The Helmholtz resonator is expressed by Equation 1 below where, as a structure constituting the Helmholtz resonator, L is the duct length, $S_p$ is the cross-sectional area of the duct opening, V is the volume within the chamber, c is the speed of sound, and $f_p$ is the port resonance frequency.

$$f_p = \frac{c}{2\pi}\sqrt{\frac{S_p}{VL}} \quad \text{[Mathematical 1]}$$

It is found from Equation 1 that the port resonance frequency $f_p$ decreases with a decrease in the cross-sectional area $S_p$ of the duct opening, an increase in the duct length L, and an increase in the volume V within the chamber. For example, a speaker system in a predetermined size attached with the Helmholtz resonator will be described. According to Equation 1, the port resonance frequency $f_p$ is about 110 Hz, where the volume V within the chamber, which is formed by the diaphragm 21 and a space in contact with the diaphragm 21 and a space in contact with the diaphragm 21, is 2.0 liters, the cross sectional area $S_p$ of the opening of the duct 14 is 3940 mm$^2$, the duct length L is 500 mm, and the speed c of sound is 343.2 m/s at a temperature of 20° C. The operation band frequency to be reproduced can be equal to or lower than 80 Hz that is the port resonance frequency using a low-pass filter, for example. Accordingly, the sound waves can be efficiently emitted at a bass frequency range.

Figure 6:
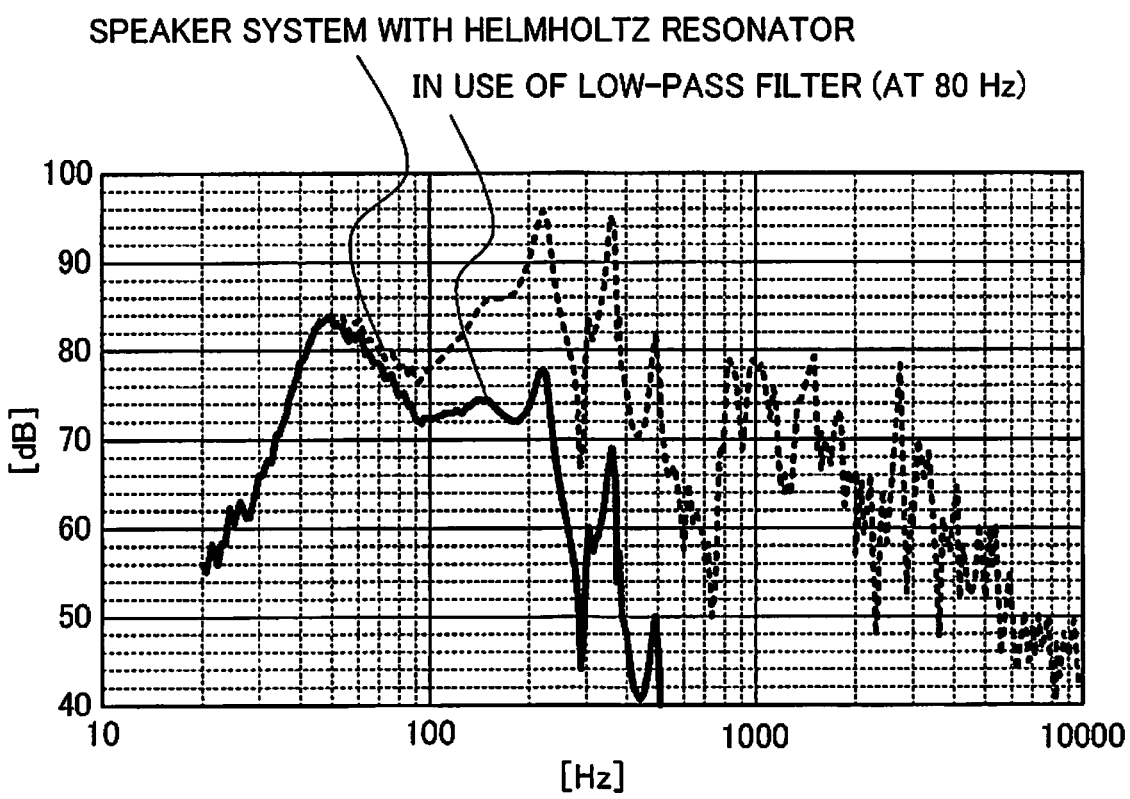
FIG. 6 is a comparison graph showing the frequency characteristics of a speaker system including a Helmholtz resonator according to the present disclosure, and the speaker system used in combination with a low-pass filter.

FIG. 6 shows the frequency characteristics of a speaker system (indicated by the solid line) obtained by attaching a Helmholtz resonator to the speaker unit 20, and a speaker system (indicated by the dotted line) used in combination with a secondary low-pass filter (with calculated values) with a cutoff frequency of 80 Hz. In FIG. 6, the horizontal axis represents the frequency (unit: Hz), and the vertical axis represents the sound pressure level (unit: dB) of the speaker system measured under predetermined conditions.

As shown in FIG. 6, the speaker system attached with the Helmholtz resonator has the maximum value of the sound pressure level around 50 Hz. In the on-vehicle woofer system (i.e., a speaker system) 1 attached with the Helmholtz resonator according to the embodiment of the present disclosure, assume that the upper limit of the operation band frequency of the speaker unit is set to 80 Hz. At this time, the volume within the chamber is set small so that the resonance frequency of the Helmholtz resonator is higher than the operation band frequency. The air mass of the duct communicating with the chamber then affects the moving mass Mms of the diaphragm, which provides the effect of reducing the minimum resonance frequency $f_o$ of the on-vehicle woofer system 1. Specifically, with a decrease in the volume within the chamber, which is in contact with the diaphragm 21 extending to the Helmholtz resonator, to about two liters, for example, the air load mass increases with respect to the diaphragm 21. This increases the moving mass Mms of the diaphragm 21 and decreases $f_o$.

As described above, the speaker system attached with the Helmholtz resonator exhibits improved bass reproduction performance. Accordingly, the on-vehicle woofer system 1 according to the embodiment of the present disclosure also exhibits improved bass reproduction performance while being in a small size.

(Placement)

Figure 7:
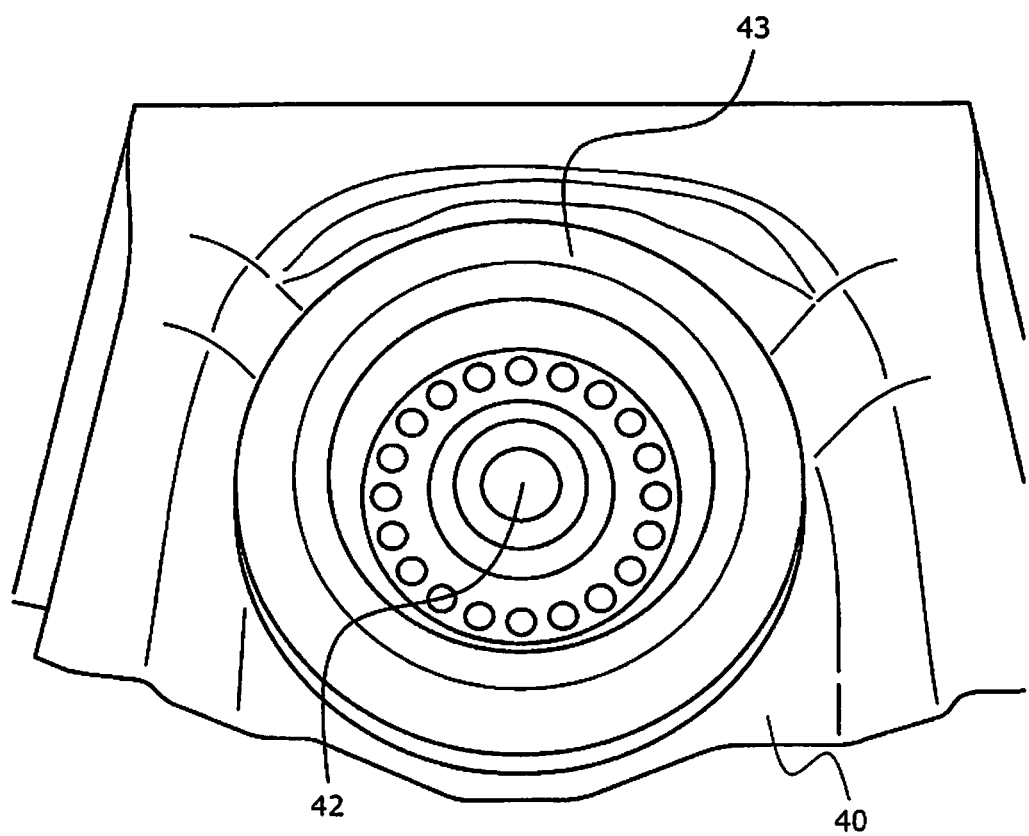
FIG. 7 is a perspective view showing a spare tire housing of an automobile.

FIG. 7 is a perspective view showing that a spare tire 43 is placed in a spare tire housing 40 in the trunk of the automobile and is fixed using the fastening member 42 such as a nut. The on-vehicle woofer system 1 according to the embodiment of the present disclosure is placed in the spare tire housing 40 in place of the spare tire 43. The spare tire housing 40 is formed as a recess in the trunk.

Figure 8:
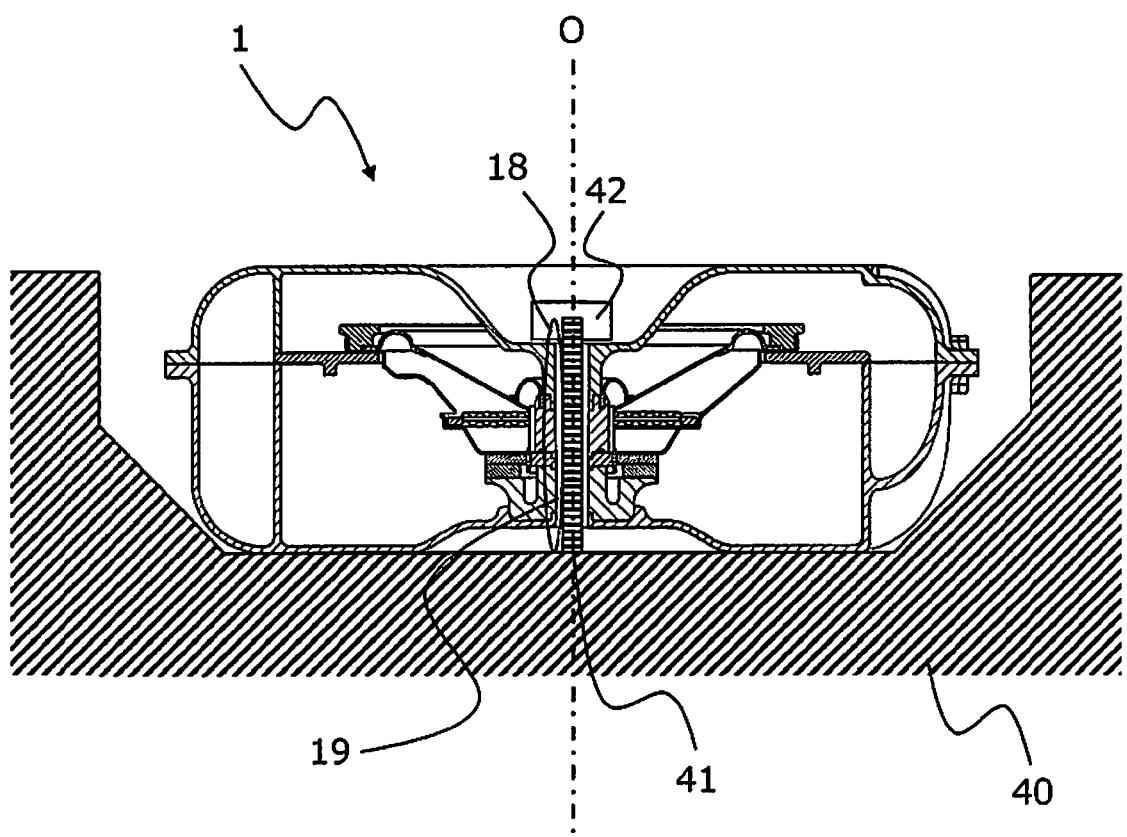
FIG. 8 is a cross-sectional view where the on-vehicle woofer system according to the embodiment of the present disclosure is mounted in the spare tire housing.

FIG. 8 is a cross-sectional view where the on-vehicle woofer system 1 according to the embodiment of the present disclosure is mounted in the spare tire housing 40. The on-vehicle woofer system 1 is in a substantially cylindrical shape and placed in the spare tire housing 40 in place of a spare tire in a cylindrical shape as well, which allows efficient utilization of the spatial volume of the spare tire housing 40. The on-vehicle woofer system 1 is fixed to the spare tire housing as follows. A bolt 41, which is a fixing tool protruding from the spare tire housing 40, is inserted through the through-hole 19 formed by the tube 18 of the on-vehicle woofer system 1. The fastening member 42 such as the nut is screwed onto the bolt 41. The on-vehicle woofer system 1 is directly fixed to the floor of the automobile, which corresponds to the bottom of the spare tire housing 40. This configuration reduces unnecessary vibrations or other troubles in the on-vehicle woofer system 1 at the time of driving the speaker unit 20.

As described above, the Helmholtz resonator to which the first surface of the diaphragm 21 is oriented, the Helmholtz resonator being connected to the speaker unit 20; the sealed container to which the second surface of the diaphragm that is the back surface of the first surface is oriented, the sealed container providing the sealed space connected to the speaker unit 20; and the tube 18 penetrating the Helmholtz resonator, the speaker unit 20, and the sealed container. This configuration allows fixing of the on-vehicle woofer system 1 using a bolt, for example, inserted through the tube 18, and secures the airtightness of the part other than the opening formed by the duct 14 of the Helmholtz resonator. Accordingly, the Helmholtz resonator allows the on-vehicle woofer system 1 to have a lower minimum resonance frequency $F_o$ and to reproduce lower bass (i.e., at a lower frequency) even using a speaker unit with a small aperture. As a result, the on-vehicle woofer system 1 reproduces even bass, while being in a small size.

In addition, the second surface of the diaphragm 21 is oriented to the sealed container so that the sound waves radiated from the first surface of the diaphragm 21 and the sound waves radiated from the second surface neither interfere nor cancel each other. This configuration provides stable bass reproduction performance.

The outer circumferential duct space 53 is segmented along the outer circumference of the speaker unit 20. The outer circumferential duct space 53 has thus a great length, without increasing the size of the on-vehicle woofer system 1. Accordingly, the port resonance frequency decreases, which improves the bass reproduction performance.

While an embodiment of the present disclosure has been described above, the present disclosure is not limited to this embodiment.

Figure 9:
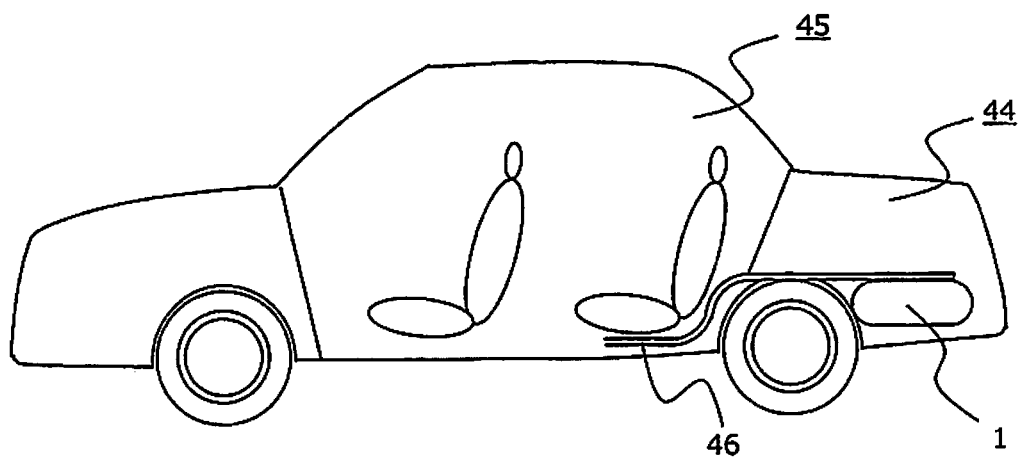
FIG. 9 is a cross-sectional view of an automobile including an on-vehicle woofer system according to a variation of the embodiment of the present disclosure.

For example, as shown in FIG. 9, a pipe 46 connected to the duct 14 of the on-vehicle woofer system 1 in a trunk space 44 may lead to a vehicle interior space 45 so that an occupant efficiently hears the sound emitted from the on-vehicle woofer system 1 in the vehicle interior space 45. In this case, the pipe 46 substantially extends the outer circumferential duct space, which decreases the port resonance frequency and improves the bass reproduction performance.

The following configuration has been described above in the embodiment. The Helmholtz resonator is located on the first surface of the diaphragm 21. The sealed container providing the sealed space is located on the second surface of the diaphragm 21 which is the back surface of the first surface. The magnetic circuit 22 is connected to the second surface of the diaphragm 21. That is, the sealed container is located on the magnetic circuit 22. Alternatively, the present disclosure may have the following configuration. The magnetic circuit 22 is connected to the first surface of the diaphragm 21, that is, the Helmholtz resonator may be located on the magnetic circuit 22.

The upper cover member 11 and the base member 12 are fastened to each other by a screw or welding. The joint between the upper cover member 11 and the base member 12 may be fastened with a seal interposed therebetween to ensure the airtightness.

The speaker unit 20 according to the embodiment described above is a speaker in the shape of a concentric ring as viewed from the front. The speaker shape is not limited thereto and may be, for example, a rectangular or like a track as viewed from the front.

DESCRIPTION OF REFERENCE CHARACTERS

1 On-Vehicle Woofer System
11 Upper Cover Member
12 Base Member
13 Intermediate Plate Member
14 Duct
18 Tube
19 Through-Hole
20 Speaker Unit
21 Diaphragm
21a Center Edge
21b Cone
21c Circumferential Edge
22 Magnetic Circuit
23 Voice Coil Bobbin
24 Yoke
24a Flange
24b Column
25 Magnet
26 Plate
27 Frame
28 Damper
29 Frame
30 First Seal
31 Second Seal
40 Spare Tire Housing
41 Bolt
42 Fastening Member
43 Spare Tire
44 Trunk Space
45 Vehicle Interior Space
46 Pipe
51 Sealed Space
52 Chamber Space
53 Outer Circumferential Duct Space

The invention claimed is:

1. An on-vehicle woofer system comprising:
   a speaker unit including a magnetic circuit and a diaphragm connected to the magnetic circuit, and capable of generating sound waves by electrically driving the magnetic circuit to vibrate the diaphragm;
   a Helmholtz resonator to which a first surface of the diaphragm is oriented, the Helmholtz resonator being connected to the speaker unit;
   a sealed container to which a second surface of the diaphragm that is a back surface of the first surface is oriented, the sealed container providing a sealed space connected to the speaker unit;
   a tube penetrating the Helmholtz resonator, the speaker unit, and the sealed container;
   an upper cover member connected to the speaker unit; and
   a duct in the upper cover member;
   wherein the Helmholtz resonator includes:
      a chamber space defined by at least the speaker unit and the upper cover member; and
      an outer circumferential duct space connected to the chamber space and segmented along an outer circumference of the speaker unit, and
      the Helmholtz resonator is configured such that the outer circumferential duct space communicates with an outside via the duct.

2. The on-vehicle woofer system of claim 1, wherein the speaker unit includes a seal for connecting the Helmholtz resonator and the sealed container to form the tube, and for separating an internal space of the Helmholtz resonator or an internal space of the sealed container from an internal space of the tube.

3. The on-vehicle woofer system of claim 1, further comprising:
   a base member connected to the speaker unit, wherein the sealed container is defined by at least the speaker unit and the base member.

4. The on-vehicle woofer system of claim 1, wherein the magnetic circuit is connected to the second surface of the diaphragm.

5. The on-vehicle woofer system of claim 1, wherein the magnetic circuit is connected to the first surface of the diaphragm.

6. The on-vehicle woofer system of claim 1, wherein the Helmholtz resonator has a resonance frequency set higher than an upper limit of an operation band frequency of the speaker unit.

7. The on-vehicle woofer system of claim 1, wherein the on-vehicle woofer system has a substantially cylindrical outer shape.

8. The on-vehicle woofer system of claim 1, wherein the on-vehicle woofer system is placed in a spare tire housing of an automobile and fixed to the spare tire housing using a fixing tool to be inserted through the tube.

* * * * *